March 2, 1926.

F. B. MIERZEJEWSKI

MOTOR SLEIGH

Filed Nov. 6, 1924

1,575,174

3 Sheets-Sheet 1

Inventor
F.B. Mierzejewski

By Bryant & Lowry
Attorneys

March 2, 1926.
F. B. MIERZEJEWSKI
1,575,174
MOTOR SLEIGH
Filed Nov. 6, 1924     3 Sheets-Sheet 2
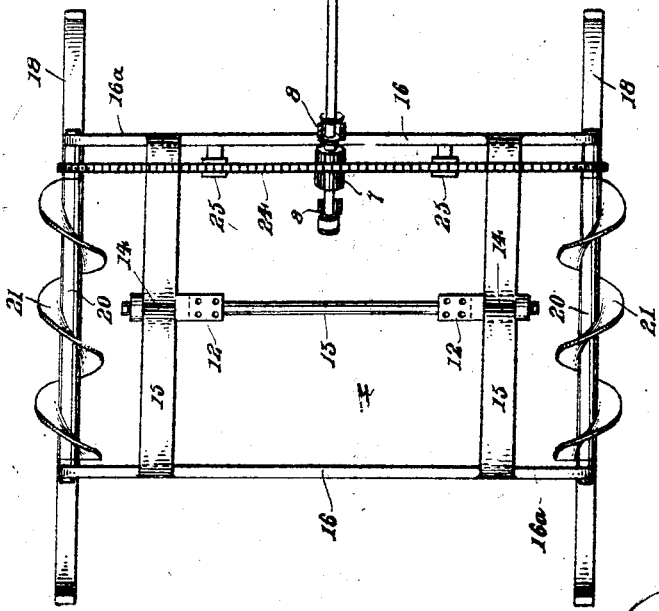
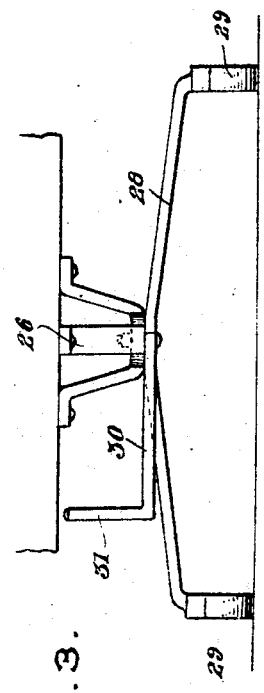
Inventor
F.B. Mierzejewski
By Bryan + Lowry
Attorneys March 2, 1926.                F. B. MIERZEJEWSKI                1,575,174
                                  MOTOR SLEIGH
                              Filed Nov. 6, 1924              3 Sheets-Sheet 3

Inventor
F. B. Mierzejewski
By Bryant & Lowry
Attorneys

Patented Mar. 2, 1926.

1,575,174

UNITED STATES PATENT OFFICE.

FRANCISZEK B. MIERZEJEWSKI, OF ADAMS, MASSACHUSETTS.

MOTOR SLEIGH.

Application filed November 6, 1924. Serial No. 748,133.

*To all whom it may concern:*

Be it known that I, FRANCISZEK B. MIERZEJEWSKI, a citizen of Poland, residing at Adams, in the county of Berkshire and State of Massachusetts, have invented certain new and useful Improvements in Motor Sleighs, of which the following is a specification.

This invention relates to certain new and useful improvements in motor sleighs and has for its primary object to provide a motor sleigh having a body construction similar to an ordinary automobile and capable of having the sleigh runners removed and automobile wheels substituted therefor and mounted upon the usual axles to adapt the device for use either as an automobile or motor sleigh.

Another object of the invention is to provide a motor sleigh capable of being constructed in a full size working apparatus with such novel features embodied therein that will be present in the toy sleigh.

A still further object of the invention is to provide a motor sleigh wherein the rear runners have motor driven propelling screws associated therewith while the runners are carried by a frame supported on the rear axle housing of the sleigh structure in a manner to permit pivotal or rocking movement of the frame and runners incident to the use thereof.

With the above and other objects in view that will become apparent as the nature of the invention is better understood, the same consists of the novel form, combination and arrangement of parts hereinafter more fully described, shown in the accompanying drawings and claimed.

Figure 1:
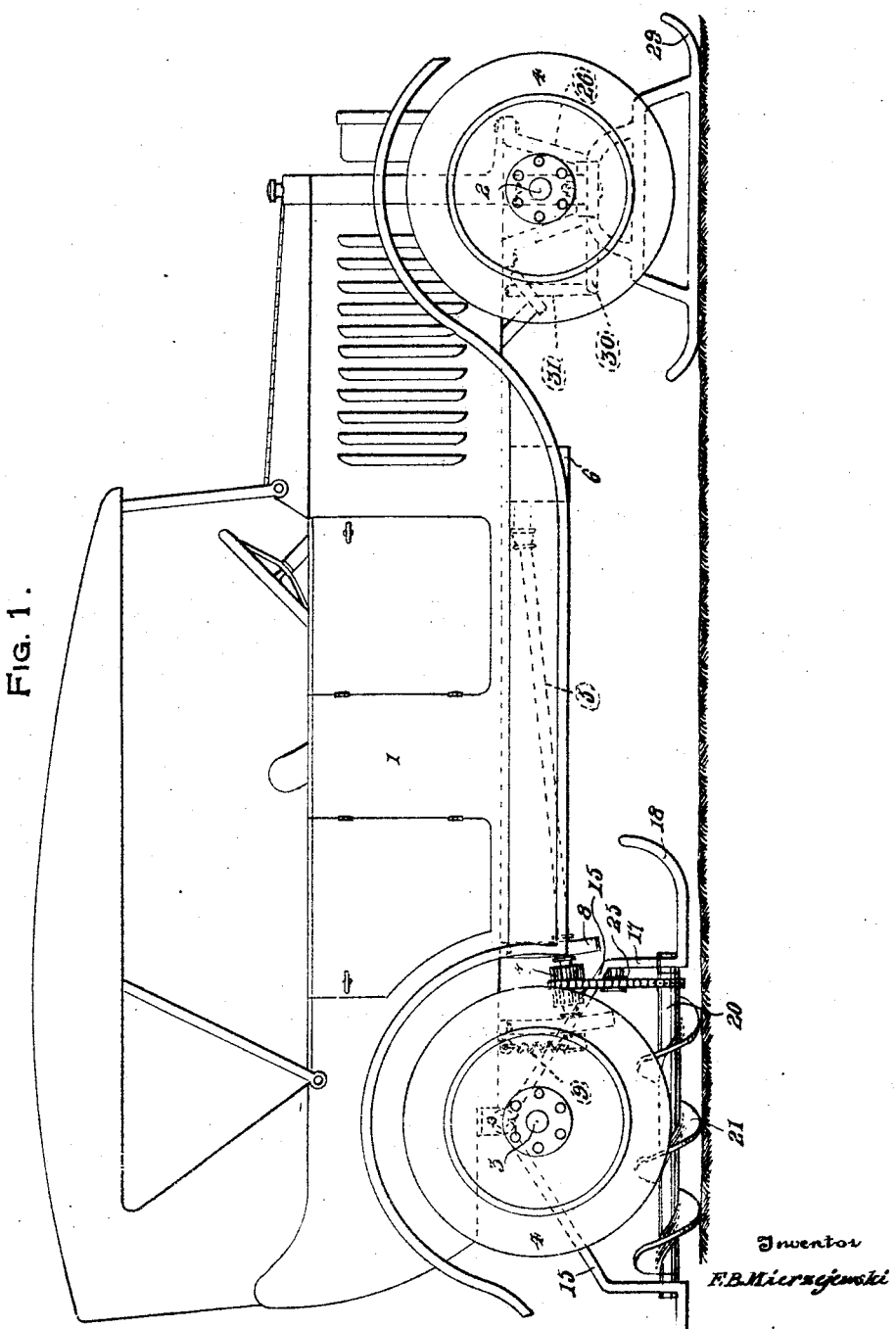

In the drawings, wherein like reference characters designate corresponding parts throughout the same, Figure 1 is a side elevational view of the combined automobile and motor sleigh constructed in accordance with the present invention, the automobile wheels and sleigh runners being illustrated in full lines with the runners or wheels capable of being removed whenever desired.

Figure 4:
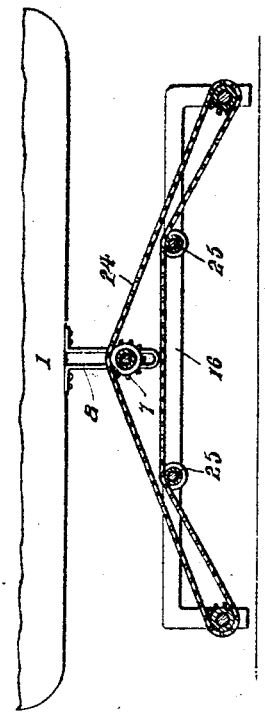
Figure 5:
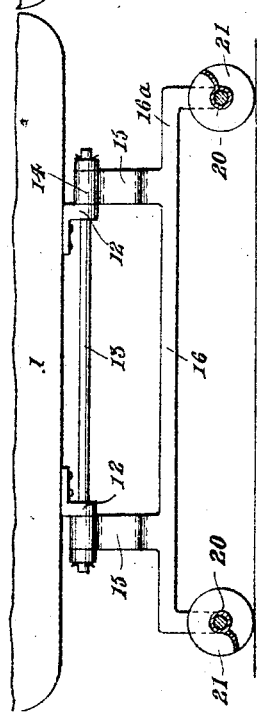

Figure 2 is a top plan view of the rear runners with the propelling screws and operating means therefor and further showing the front runners with the steering devices, Figure 3 is a fragmentary front elevational view of the front runners, Figure 4 is a cross-sectional view thru the rear runners showing the propelling screws and the pivotally mounted frame for the rear runners, Figure 5 is a cross-sectional view of the rear runners showing the operating devices for the propelling screws.

Figure 7:
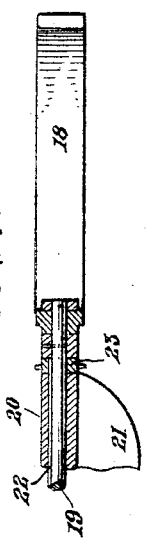
Figure 6:
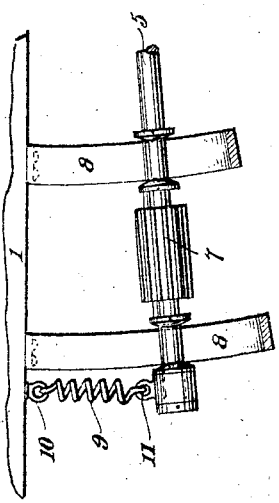

Figure 6 is a detail sectional view showing a resilient mounting for the rear end of the drive shaft and the guide devices therefor, Figure 7 is a detail sectional view, showing the forward end of one of the rear runners in top plan with the propelling screw keyed to the driven shaft journaled in the runner.

Referring more in detail to the accompanying drawings, and particularly to Fig. 1 there is illustrated a combined motor sleigh and automobile wherein the body 1 is in the form of an ordinary automobile body having front and rear axles 2 and 3 respectively upon which the usual automobile wheels 4 are mounted.

When the device is employed as a motor sleigh, the drive shaft 5 extending rearwardly from the transmission housing 6 is disconnected at its rear end from the usual differential and has an elongated pinion 7 fixed thereto as clearly shown in Fig. 6, the rear end of the shaft 5 being positioned between the side arms of the vertical guides 8 that depend from the body 1 of the structure, the rear end of the shaft being normally influenced in an upward direction by the coil spring 9 attached at its upper end as at 10 to the body 1 while the lower end thereof is attached as at 11 to the rear end of the shaft 5.

A frame structure is pivotally supported beneath the rear end of the body 1, preferably between the rear axle housing and the vehicle body, a pair of spaced brackets 12 secured to the under side of the body as illustrated in Fig. 4 having a horizontal shaft 13 journaled therein and supporting at their outer ends, the bearing ends 14 forwardly and rearwardly directed arms 15 that are connected at their outer ends by cross brace bars 16. The brace bars 16 extend laterally of the arms 15 as at 16ª and are downwardly directed as at 17, as shown in Fig. 1 and then forwardly and upwardly directed to provide runners 18.

The lower ends of the downwardly directed portions 17 of the side frames at each side of the vehicle body has a horizontal shaft 19 journaled therein as shown in Fig. 7 and upon which shaft the hub portion 20 of a screw propeller 21 is keyed as at 22. The driving devices for the screw propellers 21 include pinions 23 keyed to the shaft 19 with a sprocket chain 24 passing over the pinions 7 and 23 as shown in detail in Fig. 5, the lower section of the sprocket chain being guided by the rollers 25 carried by the adjacent brace bar 16. It will therefore be seen that when the drive shaft 5 is rotated, motion thereof is communicated to the screw propellers 21 thru the medium of the sprocket chain and pinions above described to effect the propulsion of the motor sleigh as will be readily understood from an inspection of Fig. 1. It will be noted that in view of the pivotal mounting of the arms 15 upon the rod 13, the rear runners and driving devices associated therewith are permitted limited pivotal movement beneath the body 1 of the sleigh to compensate for unevenness in travel. The sprocket chain 24 is maintained in a taut condition by the spring suspension 9 for the rear end of the drive shaft 5 irrespective of the position of the rear runners relative to the body of the sleigh.

The front steering runners are supported at the front end of the vehicle chassis by the mounting plate 26, a vertical bolt 27 as shown in Figs. 2 and 3 pivotally supporting the central meeting ends of the cross arms 28 that carry runners 29 at their outer ends. An angle arm 30 extending rearwardly from the runner supporting arms 28 carry the perpendicular pin 31 at its free end that is disposed between the fork 32 at the lower end of the steering shaft 33, the arms 28 and runners 29 being shifted by the post 33 as will at once be obvious from an inspection of Fig. 2.

While there is herein shown and described the preferred embodiment of the present invention, it is nevertheless to be understood that minor changes may be made therein without departing from the spirit and scope of the invention as claimed.

What is claimed as new is:—

In a motor sleigh, an axle; a frame consisting of a pair of arches pivoted at their central portions to the sleigh adjacent and above the axle, a pair of transverse members carried by the lower ends of the arch members and having their ends extending downwardly in parallelism and provided with oppositely disposed runner portions at their lower extremities; shafts journaled between the downwardly extending parallel portions of the transverse members and provided with propeller screws, and means to drive said shafts simultaneously.

In testimony whereof I affix my signature.

FRANCISZEK B. MIERZEJEWSKI.